(12) United States Patent
Stroberger

(10) Patent No.: US 9,471,449 B2
(45) Date of Patent: Oct. 18, 2016

(54) PERFORMING MIRRORING OF A LOGICAL STORAGE UNIT

(75) Inventor: Christopher Stroberger, Colorado Springs, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1872 days.

(21) Appl. No.: 12/810,180

(22) PCT Filed: Jan. 3, 2008

(86) PCT No.: PCT/US2008/050072
§ 371 (c)(1),
(2), (4) Date: Jun. 23, 2010

(87) PCT Pub. No.: WO2009/085326
PCT Pub. Date: Jul. 9, 2009

(65) Prior Publication Data
US 2010/0306488 A1     Dec. 2, 2010

(51) Int. Cl.
G06F 12/00 (2006.01)
G06F 11/20 (2006.01)
G06F 3/06 (2006.01)

(52) U.S. Cl.
CPC ........... *G06F 11/2074* (2013.01); *G06F 3/065* (2013.01); *G06F 3/0614* (2013.01); *G06F 3/0683* (2013.01); *G06F 11/2064* (2013.01)

(58) Field of Classification Search
CPC .... G06F 3/065; G06F 3/0614; G06F 3/0683; G06F 11/2074; G06F 11/2064
See application file for complete search history.

(56) References Cited

U.S. PATENT DOCUMENTS

| | | | |
|---|---|---|---|
| 5,544,347 A | 8/1996 | Yanai et al. | |
| 6,173,377 B1 | 1/2001 | Yanai et al. | |
| 6,658,540 B1 * | 12/2003 | Sicola et al. | 711/162 |
| 7,028,147 B2 | 4/2006 | Wu et al. | |
| 7,080,197 B2 | 7/2006 | Odenwald, Jr. | |
| 7,111,189 B1 | 9/2006 | Sicola et al. | |
| 7,177,886 B2 | 2/2007 | Pruet, III | |
| 7,228,538 B1 | 6/2007 | Burton et al. | |
| 2003/0149736 A1 | 8/2003 | Berkowitz et al. | |
| 2004/0103254 A1 | 5/2004 | Satoyama et al. | |
| 2005/0138306 A1 | 6/2005 | Panchbudhe et al. | |
| 2005/0165851 A1 | 7/2005 | Goyal | |
| 2006/0136685 A1 * | 6/2006 | Griv et al. | 711/162 |
| 2006/0136691 A1 | 6/2006 | Brown et al. | |
| 2007/0094466 A1 | 4/2007 | Sharma et al. | |
| 2007/0100909 A1 | 5/2007 | Padovano et al. | |

OTHER PUBLICATIONS

ISR/WO PCT/US2008/050072, Sep. 23, 2008, 9 pps.

* cited by examiner

*Primary Examiner* — David X Yi
*Assistant Examiner* — Alan Otto
(74) *Attorney, Agent, or Firm* — Trop, Pruner & Hu, P.C.

(57) ABSTRACT

Mirroring of a logical storage unit initially associated with a first controller is performed, where the first log segment associated with the first controller is maintained of writes by the first controller to the logical storage unit. The first log segment is for use in mirroring writes to a mirror system. Control of the logical storage unit is transferred from the first controller to at least a second controller, and in response to the transfer, a first marker is provided in the first log segment to enable the mirror system to synchronize mirrored writes corresponding to writes to the logical storage units by the first controller and at least a second controller.

23 Claims, 2 Drawing Sheets

PERFORMING MIRRORING OF A LOGICAL STORAGE UNIT

CROSS-REFERENCE TO RELATED APPLICATION

This application is a national stage application under 35 U.S.C. §371 of PCT/US2008/050072, filed Jan. 3, 2008.

BACKGROUND

Multiple copies of data can be maintained to provide redundancy in case a data storage subsystem becomes unavailable, or the data becomes damaged or lost. One technique for maintaining redundant copies of data is mirroring, in which data stored in a primary storage subsystem is replicated to a remote mirror system.

One type of mirroring is asynchronous mirroring, in which every write to a logical storage unit (a "logical storage unit" refers to some logical partition of a storage subsystem) can be recorded into a log. Entries of the log are then transmitted to the remote mirror system to recreate the corresponding writes to a mirror copy of the logical storage unit maintained in the remote mirror system.

In some cases, it may be desirable to transfer control of a particular logical storage unit from a first controller to a second controller. An issue associated with the transfer of control of the particular logical storage unit from the first controller to the second controller is that the second controller may start performing writes to the particular logical storage unit, which would have to be mirrored to the mirror copy, prior to the first controller completing the submission of entries of the log associated with the first controller.

To avoid corruption of the mirror copy of the particular logical storage unit kept at the remote mirror system due to out-of-order writes to the mirror copy, a possible solution is to shut down the mirror during the transfer operation from the first controller to the second controller. After the transfer is completed, the asynchronous mirror can be rebuilt from scratch. However, having to recreate the mirror in this manner is processing and time intensive, and can adversely affect performance of a storage subsystem. Moreover, while the mirror is offline, there would be no effective way of knowing what writes have been made to the particular logical storage unit.

BRIEF DESCRIPTION OF THE DRAWINGS

Some embodiments of the invention are described, by way of example, with respect to the following figures.

DETAILED DESCRIPTION

Figure 1:
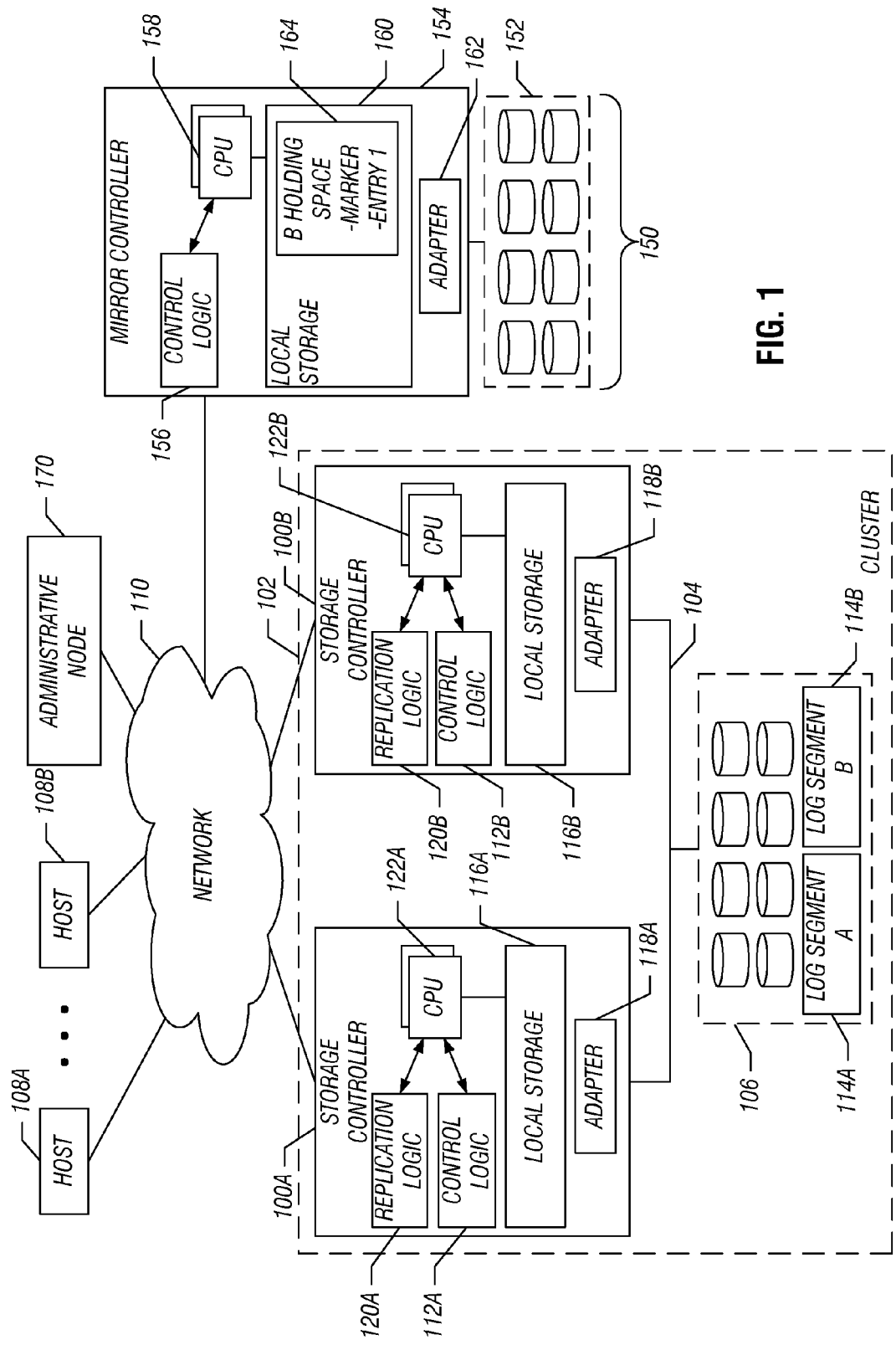
FIG. 1 is a block diagram of an example arrangement that includes a cluster of storage controllers and a remote mirror system, in accordance with an embodiment.

In accordance with some embodiments, a technique or mechanism is provided to allow a logical storage unit to be transferred between different storage controllers of a cluster without disrupting a mirror maintained at a remote mirror system. In one example, a first storage controller has control of a particular logical storage unit, such as a logical disk or logical unit (LUN). A "logical storage unit" can be any logical partition of a storage subsystem, and as examples, can include a subset of storage devices (e.g., disk drives), and so forth.

In one embodiment, a mirror copy of the particular logical storage unit maintained at the remote mirror system is an asynchronous mirror copy, which refers to a mirror copy that is not necessarily synchronized (or consistent) with the particular logical storage unit at a given point in time. To enable asynchronous mirroring, the first storage controller maintains a first log segment associated with writes to the particular logical storage unit. This first log segment contains the data associated with each write by the first storage controller to the particular logical storage unit, as well as metadata associated with each write. Examples of the metadata include timestamp information, logical storage unit identifier, and so forth. The first log segment is replayed to the remote mirror system by sending entries of the log segment to the remote mirror system such that the remote mirror system can recreate writes to the mirror copy of the particular logical storage unit at the remote mirror system. The order of writes performed at the remote mirror system is the same order as the writes performed by the first storage controller to the particular logical storage unit.

At some point, it may be desirable to transfer control of the particular logical storage unit from the first storage controller to at least a second storage controller. Transfer of logical storage units among two or more storage controllers can be performed as part of load balancing within a cluster of storage controllers. Load balancing refers to moving control of input/output (I/O) operations across the multiple storage controllers of the cluster to balance loading on the storage controllers as much as possible. Transferring control of the particular logical storage unit among storage controllers can also be performed for other reasons, such as for failure recovery (when one storage controller fails), maintenance (such as to upgrade a storage controller), or for other reasons.

After the transfer has occurred from the first storage controller to at least the second storage controller, it is possible that the log segment entries associated with the first storage controller for the transferred logical storage unit may not have been completely replayed to the remote mirror system. Once the transfer of the logical storage unit occurs, the second storage controller can start performing writes to the particular logical storage unit. Moreover, the second storage controller can also maintain a second log segment that is associated with the second storage controller, with this second log segment also being replayed to the remote mirror system to replicate writes to the mirror copy of the particular storage unit. In accordance with some embodiments, indications (also referred to as "markers") are provided with the first and second log segments to allow for the remote mirror system to synchronize the writes performed by the first and second storage controllers to the mirror copy of the logical storage unit. In one implementation, the markers can be provided as a last entry of the first log segment, and as a first entry of the second log segment. The remote mirror system, upon detecting the marker from the first log segment, will know that all writes in the first log segment have been replayed, and that the writes associated with the second storage controller can proceed to the mirror copy of the particular logical storage unit.

The marker kept in the first entry of the second log segment allows the remote mirror system, upon receiving this marker from the second log segment, to know that the writes associated with the second storage controller will have to be held (such as by storing the entries of the second log segment in a holding space in the remote mirror system) until the writes associated with the first log segment have completed.

In this manner, the writes to the mirror copy of the particular logical storage unit are kept in their original order (as performed by the first and second storage controllers), such that the mirror copy of the logical storage unit does not become corrupted. Also, host I/O operations can continue to be performed since there is no concern of corruption or other disruption of the mirror copy of the particular logical storage unit as a result of transfer of control of the logical storage unit from the first controller to at least the second controller.

FIG. 1 shows an example arrangement that includes storage controllers 100A and 100B that are part of a cluster 102. Although just two storage controllers 100A, 100B are depicted, it is noted that there may be additional storage controllers in the cluster 102. Also, even though one cluster 102 is depicted, there may be multiple clusters, where the multiple clusters are part of a storage subsystem. Generally, a "cluster" refers to any group of storage controllers with associated storage. The cluster 102 (or clusters) are part of a primary storage subsystem.

The storage controllers 100A, 100B are interconnected by a back-end network 104, such as a back-end storage area network (SAN), or other type of network. The back-end network 104 is also connected to a storage pool 106 of storage devices, which can be in the form of disk drives or other types of storage devices. In one implementation, each of the storage controllers 100A, 100B can be assigned a corresponding subset of the storage devices in the pool 106. More generally, the pool 106 includes storage resources that can be sub-divided into subsets that are assigned to corresponding storage controllers. A "storage resource" can refer to an individual physical storage device, or alternatively, the storage resource can be some partition of a storage device. By assigning subsets of storage resources in the pool 106 to corresponding storage controllers, each storage controller can behave as if the assigned storage resources are dedicated to the corresponding storage controller. In this way, the storage controllers can proceed in a manner similar to a traditional standalone storage array with respect to creating logical storage units and presenting such logical storage units to hosts 108A, 108B (e.g., client computers, server computers, personal digital assistants, etc.).

A host (108A or 108B) can perform I/O requests with respect to any of the plural logical storage units that can be presented by any of the storage controllers in the cluster 102. The I/O requests include read requests, write requests, and other requests. The I/O requests are issued by a host 108A or 108B over a network 110 (e.g., local area network, wide area network, storage area network, Internet, wireless network, or any combination of the foregoing) to the cluster 102, for processing by one of the storage controllers 100A, 100B.

An I/O request can be a write request that performs a write to a particular logical storage unit. Assuming that the particular logical storage unit that is the subject of the write request is managed by storage controller 100A, then such write request will be processed by storage controller 100A. In response to the write request, control logic 112A in the storage controller 100A performs the write to the corresponding particular logical storage unit. The write of the data associated with the write request to the particular logical storage unit (implemented as part of the pool 106 of storage resources) is performed through an adapter 118A of the storage controller 100A and over the back-end network 104.

Moreover, since asynchronous mirroring can be performed in accordance with some embodiments, the control logic 112A can cause information relating to the write request to be written to a first log segment 114A that is kept in a virtual disk in the pool 106. Alternatively, the first log segment 114A may be kept in a local storage 116A of the first storage controller 100A. The information that is written to the first log segment 114A includes data associated with the write request and the corresponding metadata.

Even though reference is made to asynchronous mirroring, techniques according to some embodiments can also be applied to synchronous mirroring, as discussed further below. "Synchronous mirroring" refers to mirroring in which a write to a logical storage unit has to complete both at the primary storage subsystem as well as at a remote mirror system prior to providing a success status back to the requesting host.

Replication logic 120A in the storage controller 100A can control the replay of the entries of the first log segment 114A to a remote mirror system 150. Replaying the entries of the first log segment 114A involves submitting the information contained in the entries of the first log segment 114A to a remote mirror system 150 over the network 110. In response to receipt of the information relating to the entries of the first log segment 114A, the remote mirror system 150 recreates (replicates) the corresponding writes to a mirror copy of the particular logical storage unit that is maintained in a pool 152 of storage resources associated with the remote mirror system 150. The remote mirror system 150 includes at least one mirror controller 154 (note that there may be multiple mirror controllers). The writes performed to the mirror copy of the particular logical storage unit are controlled by the mirror controller 154. The remote mirror system 150 can be another storage cluster or a standalone storage array system. Also, the remote mirror system 150 can be geographically remote from the primary storage subsystem, or alternatively, the remote mirror system 150 can be kept in the same geographic region (e.g., same building, same room) as the primary storage subsystem.

As further depicted in FIG. 1, the storage controller 100A also includes one or more central processing units (CPUs) 122A. The control logic 112A and replication logic 120A can be software modules executable on the CPU(s) 122A.

The second storage controller 100B contains similar components as the first storage controller 100A, including replication logic 120B, control logic 112B, CPU(s) 122B, local storage 116B, and adapter 118B. A second log segment 114B associated with the second storage controller 100B can be kept on a virtual disk in the pool 106 (or alternatively in the local storage 116B).

The mirror controller 154 also includes control logic 156 that is executable on one or more CPUs 158. The mirror controller 154 also includes a local storage 160 and an adapter 162 that is connected to the pool 152 of storage resources.

Also depicted in FIG. 1 is an administrative node (or plural administrative nodes) 170. The administrative node 170 can cause control of the transfer of the particular logical storage unit (or any other logical storage unit) among different storage controllers of the cluster 102. The transfer can be performed automatically, or alternatively, the transfer can be performed manually in response to user input at the administrative node 170. As an example of automated transfer of control of a particular logical storage unit among two or more storage controllers, the administrative node 170 can include a load balancer (to balance load across storage controllers of the cluster 102), a failover mechanism (to transfer control in response to failure of a storage controller), and so forth. Also, an administrator or other user at the administrative node 170 can see that there is excessive loading on one or more of the storage controllers in the cluster 102. In response to such detection, the user may decide to manually cause the transfer of control of logical storage units across different storage controllers.

In response to a command (or commands) from the administrative node 170 to transfer control of the particular logical storage unit from the first controller 100A to the second storage controller 100B, an exchange of messages occurs between the storage controller 100A and 100B such that the particular logical storage unit is transferred to the second storage controller 100B. Although reference is made to transfer of control of the logical storage unit from the storage controller 100A to the other storage controller 100B, note that techniques according to some embodiments can be applied in scenarios where the first controller 100A has transferred control to multiple second storage controllers.

After the transfer has occurred, any further writes (or other I/O requests) associated with the particular logical storage unit will be processed by the second storage controller 100B, rather than the first storage controller 100A. However, note that the first log segment 114A may contain writes to the particular logical storage unit that has not been completely replayed by the remote mirror system 150 to the mirror copy of the particular logical storage unit. At the same time, once the transfer of the particular logical storage unit has occurred, the second storage controller 100B can begin processing I/O requests with respect to the particular logical storage unit, including write requests. In response to a write request to the particular logical storage unit, the second storage controller 100B performs the write through the adapter 118B to the particular logical storage unit. Also, the control logic 112B of the storage controller 100B causes an entry to be added to the second log segment 114B regarding the write to the particular logical storage unit. The replication logic 120B in the second storage controller 100B controls the replication of writes contained in the second log segment 114B to the remote mirror system 150. The submission of entries of the second log segment 114B to the remote mirror system 150 may occur prior to the first log segment 114A being completely replayed.

To avoid disruption or corruption of the mirror copy of the particular logical storage unit, the control logic 112A in the storage controller 100A adds a first marker to the end of the first log segment 114A, and communicates this first marker to the storage controller 100B. The second storage controller 100B adds this first marker to the first entry of the second log segment 114B. The markers added to the log segments 114A and 114B can be in the form of a unique serial number, or can be any other type of indication. Generally, a first marker is added to the first log segment 114A, while a second marker is added to the second log segment 114B. Note that the first and second markers will have the same value (e.g., same serial number).

When the second storage controller 100B replays entries of the second log segment 114B to the remote mirror system 150, the first entry of the second log segment 114B received by the mirror controller 154 is the second marker. Receipt of this second marker is interpreted by the control logic 156 of the mirror controller 154 to mean that the write entries associated with the second log segment 114B cannot yet be written to the mirror copy of the particular logical storage unit. Rather, the control logic 156 of the mirror controller 154 causes the entries of the second log segment 114B to be kept in a holding space 164 in the local storage 160 of the mirror controller 154. Alternatively, the holding space 164 can be kept in the pool 152 of storage resources of the remote mirror system 150.

The writes contained in the holding space 164 are not replayed to the mirror copy of the particular logical storage unit until the mirror controller 154 detects the first marker from the first log segment 114A of the first storage controller 100A. By waiting for receipt of the first marker from the first log segment 114A, the proper order of the writes to the mirror copy of the particular logical storage unit can be maintained at the remote mirror system 150.

Figure 2:
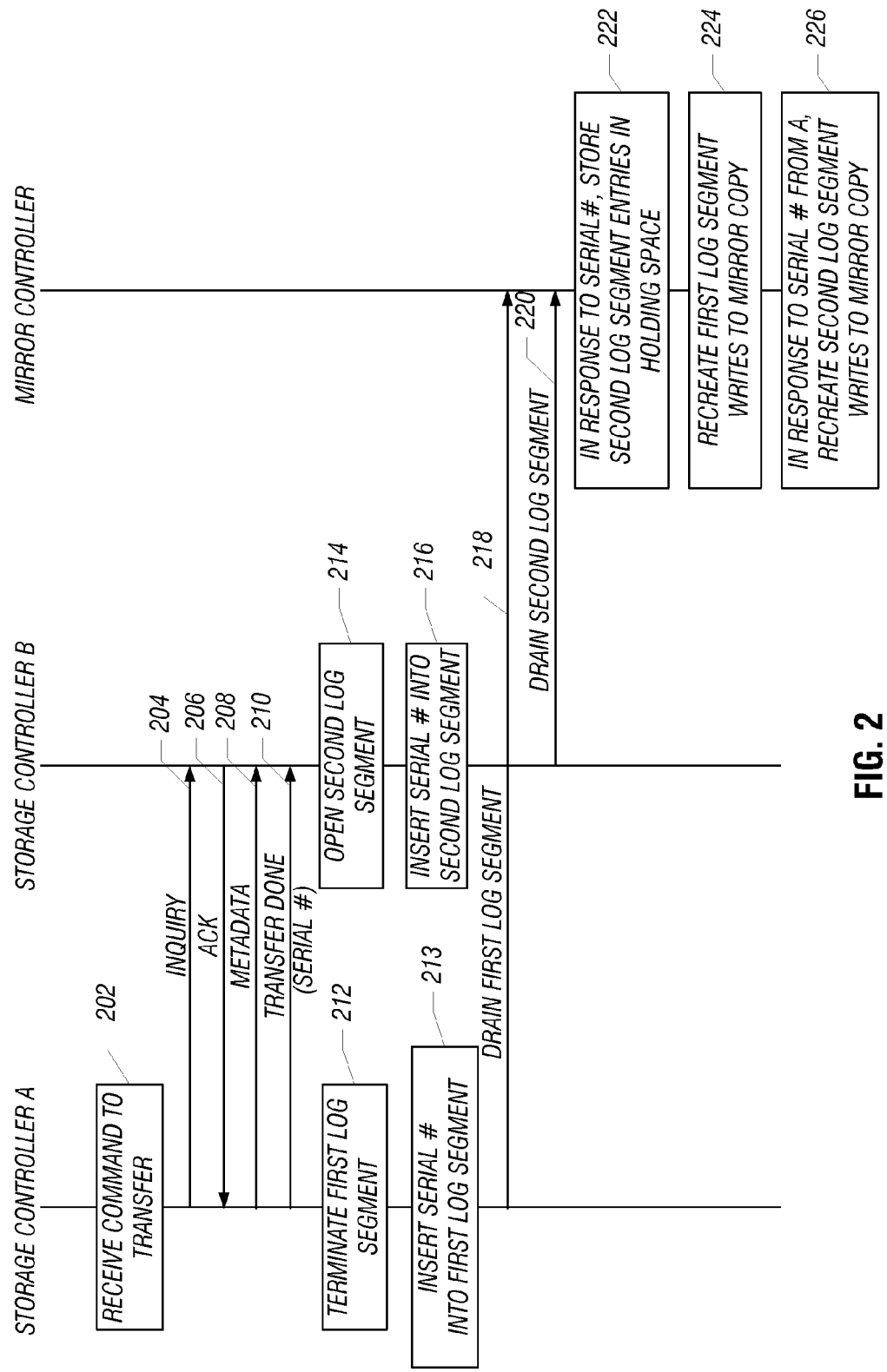
FIG. 2 is a flow diagram of a process of performing transfer of a logical storage unit between different controllers of a cluster without disrupting a mirror copy of the logical storage unit maintained at the remote mirror system, in accordance with an embodiment.

An example flow for transferring control of a particular logical storage unit (referred in this example as "LUN C") from a first storage controller (storage controller A) to a second storage controller (storage controller B) is illustrated in FIG. 2. Storage controller A can be storage controller 100A in FIG. 1, and storage controller B can be storage controller 100B in FIG. 1. Storage controller A receives (at 202) a command (or plural commands) to transfer control of LUN C from storage controller A to storage controller B. This command can be received from the administrative node 170 (FIG. 1), or alternatively, can be received from storage controllers themselves (if the storage controllers are able to determine that an issue exists that should be handled by transferring LUN C). In response to receipt of this command, storage controller A issues an inquiry (at 204) to storage controller B to determine whether storage controller B is able to accept the transfer of LUN C. In response to a positive acknowledgment sent (at 206) from storage controller B to storage controller A, storage controller A transfers (at 208) metadata associated with LUN C to storage controller B. The metadata can include information such as the RAID (Redundant Array of Independent Drives) level of LUN C, the storage resources that make up LUN C, the cache status of LUN C, and so forth. Once the metadata has been transferred, storage controller A sends (at 210) a transfer done indication to storage controller B, where the transfer done indication contains a serial number, which is one example of the first marker provided at the end of the first log segment 114A in storage controller A. Also, storage controller A terminates (at 212) the first log segment 114A since storage controller A has determined that is no longer processing I/O requests for LUN C. In closing the first log segment 114A, the storage controller A inserts (at 213) a marker (e.g., serial number) at the end of the first log segment 114A.

Storage controller B, after receipt of the transfer done indication at 210, opens (at 214) the second log segment 114B associated with LUN C. Storage controller B inserts the second marker, which in one example is the serial number received at 210, into the first entry of the second log segment.

Note that although the first log segment has been terminated in storage controller A, the entries of the first log segment may not have all been replayed to the remote mirror system 150 (FIG. 1). As a result, storage controller A continues to drain (at 218) the first log segment. Note that prior to terminating the first log segment, the storage controller A was also continually draining the first log segment. Also, as the second log segment is being filled in storage controller B, entries from the second log segment are drained (at 220) to the mirror controller 154. The first entry from the second log segment received by the mirror controller 154 is the serial number (example of the second marker in the first entry of the second log segment). In response to the second marker, the mirror controller 154 stores (at 222) the second log segment entries received by the mirror controller 154 in a holding space in the remote mirror system 150, such as holding space 164 in FIG. 1. However, the mirror controller 154 continues to recreate (at 224) the writes associated with the first log segment entries sent by storage controller A to the mirror copy of LUN C. The last entry of the first log segment that will be received by the mirror controller 154 is the serial number (first marker) provided at the end of the first log segment. In response to this serial number from storage controller A, the mirror controller 154 knows that all writes associated with the first log segment 114A have been replicated, and thus the second log segment entries can be replicated to the mirror copy of LUN C.

Note that at some point, LUN C can be transferred back from storage controller B to storage controller A, or to another different storage controller in the cluster 102. Such transfer can in fact be performed before any of the related log segments have been completely drained. If this second transfer occurs, then storage controller B will perform a message exchange similar to 204-210 in FIG. 2, and terminate the second log segment in storage controller B. Then, storage controller B adds a new marker (such as a new serial number) to the end of the second log segment. The storage controller to which the transfer is occurring will then open a new log segment, and add the new marker as the first entry of the new log segment. The remaining process would be the same as the process depicted in FIG. 2, except with different groups of storage controllers.

The mirror controller will process the new marker in the same fashion as the marker associated with the first and second log segments depicted in FIG. 2. Effectively, the markers provided in the log segments associated with LUN C are used to "stitch together" different log segments such that the mirror controller 154 is able to perform writes associated with the log segments in the original order of such writes, even though they are performed by different storage controllers to which dynamic transfer of the particular logical storage unit has occurred. Such solution can be applied to an arbitrarily long chain of changes-of-ownership for LUN C within the cluster. Each time LUN C is shifted between controllers, a new marker (e.g., new unique serial number) is assigned in the log segments.

The technique above can also be applied to a synchronous mirror arrangement during transfer of a particular logical storage unit. A synchronous mirror refers to a mirror in which data is written both locally (in the primary storage subsystem) and remotely (at the remote mirror system) before a success status is returned to the requesting host. In a synchronous mirror arrangement, transfer of a logical storage unit can also occur among storage controllers. To use techniques according to some embodiments, the synchronous mirror arrangement is first converted into an asynchronous mirror arrangement for the purpose of transferring the logical storage unit and for maintaining an order of writes to the mirror copy of the particular logical storage unit. After the respective log segments have been drained, the asynchronous mirror can be converted back to a synchronous mirror.

Instructions of software described above (including control logic 112A, 112B, 156, replication logic 120A, 120B of FIG. 1) are loaded for execution on a processor (such as one or more CPUs 122A, 122B, 158 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
performing mirroring of a logical storage unit initially associated with a first controller, wherein a first log segment associated with the first controller is maintained of writes by the first controller to the logical storage unit, the first log segment for use in mirroring the writes to a mirror system;
transferring control of the logical storage unit from the first controller to at least a second controller;
after the transfer, providing a second log segment associated with at least the second controller of writes by at least the second controller to the logical storage unit;
in response to the transfer, adding a first marker in the first log segment and a second marker in the second log segment, the first and second markers to cause the mirror system to synchronize mirrored writes corresponding to writes to the logical storage unit by the first controller and at least the second controller.

2. The method of claim 1, further comprising:
performing mirroring of the writes by at least the second controller to the mirror system according to the second log segment.

3. The method of claim 1, wherein adding the first marker and the second marker comprises adding the first and second markers having the same value.

4. The method of claim 3, wherein adding the first and second markers comprises adding a unique serial number.

5. The method of claim 1, wherein adding the first marker comprises adding the first marker as a last entry in the first log segment, and wherein adding the second marker comprises adding the second marker as a first entry of the second log segment.

6. The method of claim 5, further comprising:
in response to detecting receipt of the second marker, the mirror system holding off mirroring writes by the second controller to the logical storage unit.

7. The method of claim 6, further comprising:
the mirror system enabling mirroring of the writes by the second controller to the logical storage unit in response to detecting receipt of the first marker.

8. The method of claim 2, further comprising:
transferring control of the logical storage unit from the second controller to one of the first controller and a third controller;
in response to transferring control of the logical storage unit from the second controller, providing a third marker in the second log segment, and creating a third log segment associated with the first or third controller that also contains the third marker.

9. The method of claim 8, further comprising:
performing additional transfers of the logical storage unit among a cluster of storage controllers including at least the first, second, and third controllers; and
adding additional markers in response to the additional transfers, the additional markers to the corresponding log segments to enable the mirror system to perform mirrored writes corresponding to the writes by the storage controllers of the cluster in an original order of the writes by the storage controllers of the cluster.

10. The method of claim 1, wherein performing the mirroring of the logical storage unit comprises performing asynchronous mirroring of the logical storage unit at the mirror system.

11. The method of claim 1, wherein performing the mirroring of the logical storage unit comprises performing synchronous mirroring of the logical storage unit at the mirror system, the method further comprising:
converting the synchronous mirroring to asynchronous mirroring as part of a procedure for transferring the logical storage unit from the first controller to at least the second controller.

12. The method of claim 1, wherein adding the first marker to the first log segment and adding the second marker to the second log segment comprise adding the first and second markers at respective different entries of the first and second log segments.

13. The method of claim 1, wherein providing the second log segment after the transfer comprises opening the second log segment in response to the transfer, wherein the second log segment at a time of the opening has content different from the first log segment.

14. The method of claim 1, further comprising:
replaying entries of the first log segment to the mirror system;
replaying entries of the second log segment to the mirror system; and
holding off replication of writes corresponding to the second log segment until replication of writes corresponding to the first log segment to the mirror system has completed; and
in response to detecting the first marker, determining that the replication of writes corresponding to the first log segment has completed; and
in response to the determining, beginning the replication of writes corresponding to the second log segment to the mirror system.

15. An article comprising at least one non-transitory computer-readable storage medium containing instructions that when executed cause a first storage controller to:
receive write requests to perform writes to a logical storage unit;
in response to the write requests, creating a first log segment containing entries for the write requests;
transmit information from the entries of the first log segment to a mirror system to replicate the writes to a mirror copy of the logical storage unit;
receive at least one command to transfer control of the logical storage unit from the first storage controller to a second, different storage controller;
in response to the at least one command to transfer control of the logical storage unit, add a marker to the first log segment, and-send the marker to the second storage controller to cause the second storage controller to add the marker in a second log segment corresponding to the logical storage unit; and
transmit the marker from the first log segment to the mirror system to allow the mirror system to synchronize replication of writes to the mirror copy of the logical storage unit performed by multiple storage controllers.

16. The article of claim 15, wherein the instructions when executed cause the first storage controller to further:
exchange messaging with the second storage controller to transfer control of the logical storage unit to the second storage controller; and
terminate the first log segment.

17. The article of claim 16, wherein the instructions when executed cause the first storage controller to further:
exchange messaging with the second storage controller to cause control of the logical storage unit to be transferred back from the second storage controller to the first storage controller; and
in response to the exchange of messaging to transfer control of the logical storage unit back to the first storage controller, create a further log segment containing entries corresponding to writes to the logical storage unit performed by the first storage controller; and
add a second marker to the further log segment; and
transmit the second marker to the mirror system to allow the mirror system to hold off replication of writes indicated by the further log segment until after all writes associated with the second storage controller have been replicated by the mirror system.

18. The article of claim 15, wherein at a time the marker is sent to the second storage controller, the second log segment has content different from content of the first log segment.

19. The article of claim 18, wherein the marker is added to a given entry of the first log segment, and wherein sending the marker to the second storage controller causes the second storage controller to add the marker to a different entry of the second log segment.

20. A storage subsystem comprising:
a cluster of storage controllers; and
a pool of storage resources accessible by the storage controllers, wherein at least one logical storage unit is defined on the pool of storage resources,
the storage controllers to maintain corresponding log segments containing entries for writes performed to the logical storage unit performed by respective storage controllers,
wherein at least some of the log segments contain markers to be communicated by corresponding storage controllers to a remote mirror system to enable the remote mirror system to replicate writes corresponding to the at least some log segments in an original order of the writes, and wherein in response to a transfer of the logical storage unit from a first of the storage controllers to a second of the storage controllers:
the first storage controller is configured to add a first marker into a first of the log segments; and the second storage controller is configured to add the first marker into a second of the log segments, wherein the first and second log segments have different content at a time of the transfer.

21. The storage subsystem of claim 20, wherein the first storage controller receives a command to transfer control of the logical storage unit to the second storage controller, and the adding of the first marker to the first and second log segments is in response to the command.

22. The storage subsystem of claim 21, wherein the first storage controller is configured to communicate the first marker to the second storage controller to cause the second storage controller to add the first marker to the second log segment.

23. The storage subsystem of claim 20, wherein the first storage controller is configured to replay entries of the first log segment to the remote mirror system, and wherein the second storage controller is configured to replay entries of the second log segment to the remote mirror system,
wherein the first marker in the second log segment is an indication to the remote mirror system to hold off replication of writes corresponding to the second log second until replication of writes corresponding to the first log segment to the remote mirror system has completed, and wherein the first marker in the first log segment is to cause the remote mirror system to determine that the replication of writes corresponding to the first log segment has completed such that the remote mirror system begins the replication of writes corresponding to the second log segment to the remote mirror system.

* * * * *